United States Patent
Berggren et al.

(10) Patent No.: US 7,801,089 B2
(45) Date of Patent: Sep. 21, 2010

(54) ENCODING METHOD AND APPARATUS FOR FRAME SYNCHRONIZATION SIGNAL

(75) Inventors: Fredrik Berggren, Vasby (SE); Branislav Popovic, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/757,844

(22) Filed: Apr. 9, 2010

(65) Prior Publication Data

US 2010/0185743 A1 Jul. 22, 2010

Related U.S. Application Data

(63) Continuation of application No. PCT/CN2008/072651, filed on Oct. 10, 2008.

(30) Foreign Application Priority Data

Oct. 10, 2007 (CN) .................. 2007 1 0163128

(51) Int. Cl.
*H04B 7/216* (2006.01)
(52) U.S. Cl. ................. 370/335; 370/342; 370/350
(58) Field of Classification Search ......... 370/328–330, 370/335, 342, 350
See application file for complete search history.

(56) References Cited

U.S. PATENT DOCUMENTS

| | | | |
|---|---|---|---|
| 6,185,244 B1 * | 2/2001 | Nystrom et al. | 375/145 |
| 6,717,930 B1 * | 4/2004 | Sezgin et al. | 370/335 |
| 7,154,973 B2 * | 12/2006 | Hanada et al. | 375/354 |
| 2007/0177682 A1 * | 8/2007 | Han et al. | 375/260 |
| 2008/0080439 A1 | 4/2008 | Aziz et al. | |

FOREIGN PATENT DOCUMENTS

| | | |
|---|---|---|
| CN | 1741680 A | 3/2006 |
| CN | 101001234 A | 7/2007 |
| WO | WO 2007/109220 A2 | 9/2007 |

OTHER PUBLICATIONS

3GPP TR 25.814 V7.0.0, evolved Universal Terrestrial Radio Access (UTRA) (Release 7), Technical Report, 126 pages, 2006.*
3GPP TSG RAN WG1 #49bis, 5.2 SCH and Cell Search, "S-SCH sequences based on concatenated Golay-Hadamard codes," R1-072897, Jun. 25-29, 2007, 7 pages.

(Continued)

*Primary Examiner*—Frank Duong
(74) *Attorney, Agent, or Firm*—Slater & Matsil, L.L.P.

(57) ABSTRACT

An encoding method for a frame synchronization signal includes: encoding a predetermined intermediate variable corresponding to a cell ID or cell group ID to obtain short codes corresponding to the cell ID or cell group ID; and generating SCH codewords according to the said short codes, instead of directly encoding the cell ID or cell group ID, thereby ensuring that a first short code in each generated S-SCH codeword is larger than a second short code, or a first short code in each generated S-SCH codeword is smaller than a second short code, and a short code distance thereof is relatively small, so as to enhance the reliability of the frame synchronization. An encoding apparatus for a frame synchronization signal is further provided.

18 Claims, 1 Drawing Sheet

OTHER PUBLICATIONS

3GPP TSG RAN WG1 meeting #50, 7.2.7 SSC, PSC, "Scrambling and information encoding for the S-SCH," R1-073514, Aug. 20-24, 2007, 6 pages.

3GPP TS 36.211 V8.0.0 (Sep. 2007), "3$^{rd}$ Generation Partnership Project; Technical Specification Group Radio Access Network; Evolved Universal Terrestrial Radio Access (E-UTRA); Physical channels and modulation (Release 8)," Sep. 2007, 50 pages.

3GPP TSG RAN WG1 Meeting #50bis, 6.2.6, "Evaluation of Scrambling Methods for S-SCH," R1-074024, Oct. 8-12, 2007, 8 pages.

3GPP TSG RAN WG1 meeting #50bis, 6.2.6 SSC, PSC, "Scrambling and information encoding for the S-SCH," R1-074230, Oct. 8-12, 2007, 7 pages.

3GPP TSG-RAN WG 1 Meeting #50bis, 6.2.6, "Scrambling of the Secondary Synchronization Signal," R1-074374, Oct. 8-12, 2007, 6 pages.

3GPP TSG RAN WG1 50bis, 6.2.6, "Secondary SCH Mapping and Scrambling," R1-074143, Oct. 8-12, 2007, 10 pages.

3GPP TSG RAN WG1 50bis, 6.2.6, "Way Forward for Secondary SCH Mapping and Scrambling," R1-074498, Oct. 8-12, 2007, 3 pages.

* cited by examiner

ENCODING METHOD AND APPARATUS FOR FRAME SYNCHRONIZATION SIGNAL

This application is a continuation of co-pending International Application No. PCT/CN2008/072651, filed Oct. 10, 2008, which designated the United States and was not published in English, and which claims priority to Chinese Application No. 200710163128.X filed Oct. 10, 2007, both of which applications are incorporated herein by reference.

TECHNICAL FIELD

The present invention relates to a synchronization technology in a mobile communication system, and more particularly to an encoding method and apparatus for a frame synchronization signal.

BACKGROUND

In the mobile communication system, user equipment (UE) needs to execute an initial access procedure before exchanging information with a base station, so as to realize timing synchronization and finish searching for a cell (acquiring a cell ID) or searching for a cell group (acquiring a cell group ID). The timing synchronization includes symbol synchronization and frame synchronization. Generally, the UE realizes symbol synchronization by detecting a primary-synchronization (P-SCH) signal sent by the base station, and realizes frame synchronization by detecting a secondary-synchronization (S-SCH) signal sent by the base station. The S-SCH signal carries information of a cell ID or a cell group ID, so as to enable the UE to finish searching for a cell or a cell group while realizing the frame synchronization.

In the 3rd Generation Partnership Project Long Term Evolution (3GPP LTE) standard, each radio frame (10 ms) has two S-SCH signals which are respectively located in orthogonal frequency division multiplexing (OFDM) symbols of the 0th sub-frame and the 5th sub-frame, and the transmission interval between them is 5 ms. Each of the S-SCH signals includes two secondary synchronization code (SSC) sequences, and each SSC sequence is selected from a sequence set formed by M sequences with a length of 31 respectively. The sequence set is referred to as an SSC sequence set, and each SSC sequence is an element of the SSC sequence set. Thus, the two SSC sequences included in each S-SCH signal of each radio frame are generally represented as (Sa, Sb), in which a and b respectively represent the indices of the two SSC sequences in the above sequence set.

The values of index a and b are referred to as short codes, so that the S-SCH including Sa and Sb may be identified as a codeword [a, b] formed by the indices a and b, which is called an S-SCH codeword. S-SCH codewords formed by different values of a and b represent different S-SCH signals, and each of the two S-SCH signals correspond to one of 170 cell IDs or cell group IDs. In this manner, 340 different S-SCH signals are required, and correspondingly, 340 S-SCH codewords exist.

In order to detect an S-SCH signal, the UE correlates the received S-SCH signal with all the SSC sequences in the SSC sequence set, and identifies two SSC sequences corresponding to the relevant peak values (i.e. short codes in the S-SCH codeword).

In order to further reduce the synchronization time of the UE, two S-SCH signals in the same frame are set to include two same SSC sequences, but the two SSC sequences have different arranging order in each S-SCH signal. That is to say, the two SSC sequences included in the S-SCH signal of the sub-frame 0 are sequentially (Sa, Sb), and the two SSC sequences included in the S-SCH signal of the sub-frame 5 are sequentially (Sb, Sa). Thus, the UE can realize the frame synchronization and acquire the cell group ID only through detecting the S-SCH signal in one sub-frame.

Based on the above method, 170 S-SCH codewords need to be set as each corresponding to each cell ID or cell group ID. It is assumed that, among the 170 S-SCH codewords, the S-SCH codeword (corresponding to the S-SCH signal in the sub-frame 0) corresponding to the cell IDi of the ith cell is represented as $ci=[s_{i0},s_{i1}]$, $i=0\sim169$, in which $S_{i0}$ indicates a first short code (i.e. the short code a), $S_{i1}$ indicates a second short code (i.e. the short code b); and then the first short code and the second short code are reversed, so as to obtain the other 170 S-SCH codewords (corresponding to the S-SCH signals in the sub-frame 5) $ci=[s_{i1},s_{i0}]$, $i=0\sim169$, which have a reversed short code sequence.

At the boundaries of a plurality of cells, the UE may detect SSC sequences from many different cells, and the detected SSC sequences from each cell have similar correlation value, so that the S-SCH signals detected by the UE may be formed by SSC sequences respectively from two different cells. For example, if the S-SCH codeword ci of the cell i is $[s_{i0},s_{i1}]$, and the S-SCH codeword cj of the cell j is $\lfloor s_{j0},s_{j1} \rfloor$, the UE may incorrectly detect the S-SCH signals such as $\lfloor s_{i0},s_{j1} \rfloor$ or $\lfloor s_{j0}, s_{i1} \rfloor$ including the SSC sequences respectively from two different cells at the boundary of the two cells. Apparently, such S-SCH signals are invalid, and the UE cannot obtain the frame synchronization or acquire the cell group ID. Thus, in order to reduce the occurrence of the above circumstance and enhance the reliability of the frame synchronization, all the set S-SCH codewords need to fulfill $s_{i0}<s_{i1}$ (or $s_{i0}>s_{i1}$), that is, the magnitude relation between the first short code and the second short code in each S-SCH codeword needs to be the same, and the maximum short code distance $|s_{i0}-s_{i1}|$ between two short codes needs to be as small as possible. If all the S-SCH codewords satisfy $s_{i0}<s_{i1}$ (or $s_{i0}>s_{i1}$), the UE may realize the frame synchronization even if the UE does not acquire the cell group ID.

An encoding method for an S-SCH codeword is proposed in the related art, which may be used to obtain all the S-SCH codewords and a cell ID or a cell group ID corresponding to each S-SCH codeword.

Particularly, the encoding method may be represented as:

$$s_0(ID) = \mod(ID, 31)$$

$$s_1(ID) = mod\left(s_0(ID) + \left\lfloor \frac{ID}{31} \right\rfloor + 1, 31\right)$$

Equation 1

The variable ID indicates a cell ID or cell group ID, $s_0$ (ID) indicates a first short code corresponding to the cell ID or cell group ID, $s_1$ (ID) indicates a second short code corresponding to the cell ID or cell group ID, 31 indicates the number of elements in the SSC sequence set, and $$\left\lfloor \frac{ID}{31} \right\rfloor$$

indicates the maximum integer smaller than the value of a quotient of dividing the cell ID or cell group ID by the SSC sequence length.

During the process of realizing the above encoding solution, the inventor(s) found that the related art has the following problem: the S-SCH codewords obtained through the above encoding method may not all satisfy the conditions that, the first short code in each generated S-SCH codeword is larger than the second short code, or the first short code in each generated S-SCH codeword is smaller than the second short code, and the short code distance shall be as small as possible, and as a result, it may not ensure the reliability of the frame synchronization.

SUMMARY OF THE INVENTION

Accordingly, embodiments of the present invention provide an encoding method and an encoding apparatus for a frame synchronization signal in a communication system, so that reliability of frame synchronization is enhanced.

An embodiment of the present invention provides an encoding method for a frame synchronization signal in a communication system. The method includes:

encoding a predefined intermediate variable corresponding to a cell ID or cell group ID to obtain short codes corresponding to the cell ID or cell group ID; and generating secondary synchronization channel S-SCH codewords according to the short codes, wherein, in each generated S-SCH codeword, a first short code is larger than a second short code, or, in each generated S-SCH codeword, a first short code is smaller than a second short code, and a short code distance thereof is all smaller than or equal to a predefined threshold value.

An embodiment of the present invention provides an encoding apparatus for a frame synchronization signal in a communication system. The apparatus includes an encoding unit and a codeword generating unit.

The encoding unit is configured to encode a predefined intermediate variable corresponding to a cell ID or cell group ID so as to obtain short codes corresponding to the cell ID or cell group ID.

The codeword generating unit is configured to generate S-SCH codewords according to the short codes, and a first short code in each generated S-SCH codeword is larger than a second short code, or a first short code in each generated S-SCH codeword is smaller than a second short code, and a short code distance is all smaller than or equal to a predefined threshold value.

An embodiment of the present invention further provides another encoding method, which can enhance the reliability of frame synchronization when being applied for frame synchronization.

The encoding method includes encoding a variable N that is a non-negative integer into two codewords $Sa(N)=[s_0(N), s_1(N)]$ and $Sb(N)=[s_1(N),s_0(N)]$, which specifically includes:

$$s_0(N) = \mod(N', L)$$

$$s_1(N) = \mod\left(s_0(N) + \left\lfloor \frac{N'}{L} \right\rfloor + 1, L\right),$$

in which $$N' = N + \frac{k(k+1)}{2}$$

$$k = \left\lfloor \frac{N + \frac{k'(k'+1)}{2}}{L-1} \right\rfloor$$

-continued $$k' = \left\lfloor \frac{N}{L-1} \right\rfloor$$

$$s_0(N), s_1(N) \in \{0, 1, \ldots, L-1\},$$

L is a positive integer.

Compared with the related art, a predefined intermediate variable corresponding to a cell ID or cell group ID is encoded in the embodiments of the present invention so as to obtain short codes corresponding to the cell ID or cell group ID, and then S-SCH codewords are generated according to the short codes, instead of directly encoding the cell ID or cell group ID, thereby in each S-SCH codeword, ensuring a first short code to be all larger than or smaller than a second short code, and a short code distance thereof to be all relatively small. Therefore, the reliability of the frame synchronization is enhanced.

BRIEF DESCRIPTION OF THE DRAWINGS

In order to describe the embodiments of the present invention or the technical solution in the related art clearly, the drawings to be used in the description of embodiments or the related art will be introduced simply. It is obvious that the following drawings are only some of the embodiments of the present invention; the persons of technical skill in the field can obtain the other drawings according to these drawings without paying creative work.

DETAILED DESCRIPTION OF ILLUSTRATIVE EMBODIMENTS

The inventor(s) found that, although the encoding method in the related art can acquire all the S-SCH codewords and a cell ID or a cell group ID corresponding to each S-SCH codeword, without storing any corresponding table, however, all the S-SCH codewords $[s_0(ID),s_1(ID)]$ acquired through the encoding method of the related art not only include codewords of $s_0(ID)<s_1(ID)$, but also include codewords of $s_0(ID)>s_1(ID)$, that is, the magnitude relations between the first short code and the second short code in each S-SCH codeword are not completely the same, and a part of the S-SCH codewords have larger short code distance, which cannot satisfy the above condition that the short code distance should be relatively small. For example, S-SCH codewords corresponding to the cell IDs or cell group IDs of 30, 60, 61, 90, 91, 92, 120, 121, 122, 123, 150, 151, 152, 153, and 154 cannot satisfy the above condition.

The technical solution of the present invention is described clearly and completely in the embodiments with reference to the accompanying drawings. Apparently, the described embodiments are only part of the embodiments of the present invention, rather than all the embodiments of the present invention. All the other embodiments that can be achieved by those of people with technical skill in the field without any creative work based on the embodiments in the present invention fall within the protection scope of the present invention.

The present invention is further described below in detail through the embodiments with reference to the accompanying drawings.

In an embodiment of the present invention, a predefined intermediate variable corresponding to a cell ID or cell group ID is encoded so as to obtain short codes corresponding to the cell ID or cell group ID, and then S-SCH codewords are generated according to the short codes, thereby ensuring that, in each S-SCH codeword acquired through encoding, a first short code in each generated S-SCH codeword is larger than a second short code, or a first short code in each generated S-SCH codeword is smaller than a second short code, and a short code distance thereof is all relatively small.

Figure 1:
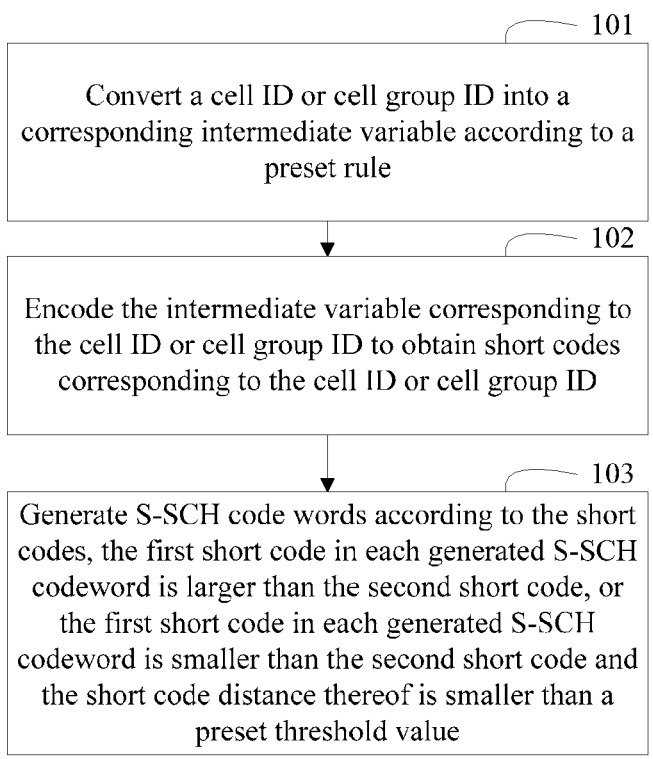
FIG. 1 is a schematic flow chart of an encoding method for a frame synchronization signal according to an embodiment of the present invention.

FIG. 1 is a schematic flow chart of an encoding method for a frame synchronization signal according to an embodiment of the present invention. Referring to FIG. 1, the encoding method for a frame synchronization signal in this embodiment includes the following steps.

In Step 101, a cell ID or cell group ID is converted into a corresponding intermediate variable according to a predefined rule. That is to say, each cell ID or cell group ID corresponds to one intermediate variable.

In this step, one converting manner can be adding a predefined offset to each cell ID or cell group ID sequentially so as to obtain an intermediate variable. Then, the intermediate variable with the predefined offset added is taken as the cell ID or cell group ID.

The predefined offset can be set arbitrarily, thereby ensuring that, in each S-SCH codeword corresponding to the cell IDs or cell group IDs with the added predefine offset, each first short code is all larger than or smaller than a second short code, and a short code distance thereof is smaller than or equal to a preset threshold value.

In Step 102, the intermediate variable corresponding to the cell ID or cell group ID is encoded so as to obtain short codes corresponding to the cell ID or cell group ID.

In Step 103, S-SCH codewords are generated according to the short codes obtained through encoding, and the first short code in each generated S-SCH codeword is larger than the second short code, or the first short code in each generated S-SCH codeword is smaller than the second short code, and the short code distance thereof is all smaller than or equal to a predefined threshold value. The magnitude of the predefined threshold value is associated with the number of cells or cell groups. Generally, the more the cells or cell groups are, the larger the preset threshold value will be. For example, when the number of the cells or cell groups is 170, the threshold value set for the short code distance is 7, and the maximum short code distance in the S-SCH codewords is 6 or 7.

Till now, the flow chart is ended.

The above flow chart is further illustrated below through an example.

It is known that part of the S-SCH codewords obtained through Equation 1 in the related art cannot satisfy the conditions that the short code distance $|s_0(ID)-s_1(ID)|$ is relatively small and $s_0(ID)<s_1(ID)$ (or $s_0(ID)>s_1(ID)$) in all S-SCH codewords, for example, S-SCH codewords corresponding to the cell IDs or cell group IDs of 30, 60, 61, 90, 91, 92, 120, 121, 122, 123, 150, 151, 152, 153, and 154. Thus, in this embodiment, an intermediate variable ID' is introduced, which is converted from a cell ID or cell group ID, and replaces the variable ID in Equation 1 so as to avoid the cell IDs or cell group IDs of 30, 60, 61, 90, 91, 92, 120, 121, 122, 123, 150, 151, 152, 153, and 154 from appearing, such that the S-SCH codewords obtained through encoding all satisfy the above conditions.

For example, in order to avoid obtaining a corresponding S-SCH codeword that cannot satisfy the conditions when ID=30 according to Equation 1, ID=30 may be converted into ID'=31. That is to say, a predefined offset is added to the variable ID, and the ID' is used to replace the variable ID in Equation 1, and then ID=31 is converted into ID'=32 to execute the above replacement, and so forth.

In practical applications, the converting relation between ID and ID' may be expressed as:

$$ID'=ID+k(k+1)/2$$

In the above equation, the value of k changes along with the change of the value of the variable ID.

For example:
k=0 0≦ID≦29
k=1 30≦ID≦58
k=2 59≦ID≦86
k=3 87≦ID≦113
k=4 114≦ID≦39
k=5 140≦ID≦164
k=6 165≦ID≦169

The above changing relation between the value of k and the value of the variable ID may be uniformly expressed as:

$$30k'-k'(k'-1)/2 \leq ID \leq 30(k'+1)-k'(k'+1)/2-1$$

In the above equation, $$k' = \left\lfloor \frac{ID}{30} \right\rfloor,$$

and the relation between k and k' may be expressed as $$k = \left\lfloor \frac{ID + \frac{k'(k'+1)}{2}}{30} \right\rfloor.$$

In this embodiment, the symbol $\lfloor \ \rfloor$ represents selecting the maximum integer smaller than a value.

Finally, the encoding method for obtaining S-SCH codewords corresponding to different values of the variable ID may be expressed as:

$$s_0(ID) = \mathrm{mod}(ID', L) \qquad \text{Equation 2}$$

$$s_1(ID) = \mathrm{mod}\left(s_0(ID) + \left\lfloor \frac{ID'}{L} \right\rfloor + 1, L\right)$$

In which $$ID' = ID + \frac{k(k+1)}{2}; \qquad \text{Equation 3}$$

$$k = \left\lfloor \frac{ID + \frac{k'(k'+1)}{2}}{L-1} \right\rfloor; \qquad \text{Equation 4}$$

$$k' = \left\lfloor \frac{ID}{L-1} \right\rfloor. \qquad \text{Equation 5}$$

In the above equations, L is a positive integer, and indicates the number of elements in an SSC sequence set. And $s_0(ID)$ indicates the first short code corresponding to the cell ID or cell group ID, $s_1(ID)$ indicates the second short code corresponding to the cell ID or cell group ID, and L is a positive integer.

The above encoding method can ensure that, in the S-SCH signals corresponding to different cell IDs or cell group IDs obtained through encoding, the short code distance is relatively small and the first short code in each generated S-SCH codeword is larger than the second short code, or the first short code in each generated S-SCH codeword is smaller than the second short code.

That is, in the method shown in FIG. 1, the intermediate variable in Step 101 can be acquired through Equations 3-5, and Step 102 can be realized through Equation 2.

In this embodiment, the number of elements in the SSC sequence set is, for example, 31 and 170 cells or cell groups, and short codes corresponding to each cell ID or cell group ID are obtained through encoding according to Equations 2-5, with reference to Table 1.

TABLE 1

| ID | S0 | S1 |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |

TABLE 1-continued

| ID | S0 | S1 |
|---|---|---|
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| 168 | 3 | 10 |
| 169 | 4 | 11 |

As seen from Table 1, the short code distance between two short codes obtained through the encoding method for a frame synchronization signal in this embodiment and corresponding to each cell ID or cell group ID is relatively small (the maximum short code distance in Table 1 is only 7), and for the two short codes in the codeword corresponding to each cell ID or cell group ID, the first short code (S1 in Table 1) is smaller than the second short code (S2 in Table 1). Thus, in this embodiment, the encoding method for a frame synchronization signal can ensure that, each S-SCH corresponding to the cell ID or cell group ID can satisfy the conditions that the first short code in each generated S-SCH codeword is larger than the second short code, or the first short code in each generated S-SCH codeword is smaller than the second short code, and the short code distance thereof is relatively small, thereby enhancing the reliability of the frame synchronization.

In practical applications, as for the number of elements L in the SSC sequence set that is set randomly, Equations 2-5 in this embodiment can also ensure that the obtained S-SCH signals can satisfy the above conditions.

However, as the value range M of the cell ID or cell group ID increases, that is, as the number of the required S-SCH codewords increases, the maximum short code distance $|s_0-s_1|$ between the two short codes corresponding to each cell ID or cell group ID obtained through encoding also increases, as shown in Table 2.

TABLE 2

| L | $|s_0 - s_1|$ | M |
|---|---|---|
| 18 | 7 | 98 |
| 19 | 7 | 105 |
| 20 | 7 | 112 |
| 21 | 7 | 119 |
| 22 | 8 | 140 |
| 23 | 8 | 148 |
| 24 | 8 | 156 |
| 25 | 8 | 164 |
| 26 | 8 | 172 |
| 27 | 8 | 180 |
| 28 | 8 | 188 |
| 29 | 9 | 216 |
| 30 | 9 | 225 |
| 31 | 9 | 234 |

In addition, Table 3 further lists the maximum short code distances $|s_0-s_1|$ corresponding to different SSC sequence lengths L when the maximum value range M of the cell IDs or cell group IDs equals to 170, in which the number of the cell IDs or cell group IDs are the same as that of the S-SCH codewords. As seen from Table 3, in the case of the same number of S-SCH codewords, the larger the SSC sequence length L is, the corresponding maximum short code distance $|s_0-s_1|$ will be.

TABLE 3

| L | $|s_0 - s_1|$ |
|---|---|
| 26 | 8 |
| 27 | 8 |
| 28 | 8 |
| 29 | 7 |
| 30 | 7 |
| 31 | 7 |

In practical applications, in order to reduce the maximum short code distance $|s_0-s_1|$ between two short codes corresponding to each cell ID or cell group ID, and further reduce the ambiguity phenomena during the detection by the UE, an SSC sequence with a larger length may be preferably used.

In an embodiment of the present invention, the encoding method constituted by Equations 2-5 can be expressed as follows.

A variable ID having a value of a non-negative integer is encoded into two codewords $Sa(ID)=[s_0(ID),s_1(ID)]$ and $Sb(ID)=[s_1(ID),s_0(ID)]$, in which the codewords are generated according to the following equations.

$$s_0(ID) = \mod(ID', L)$$

$$s_1(ID) = \mod\left(s_0(ID) + \left\lfloor \frac{ID'}{L} \right\rfloor + 1, L\right),$$

in which $$ID' = ID + \frac{k(k+1)}{2}$$

$$k = \left\lfloor \frac{ID + \frac{k'(k'+1)}{2}}{L-1} \right\rfloor$$

-continued $$k' = \left\lfloor \frac{ID}{L-1} \right\rfloor$$

$s_0(ID), s_1(ID) \in \{0, 1, \ldots, L-1\},$

L is a positive integer.

Besides being applied to generate S-SCH codewords for frame synchronization, the above encoding method is also suitable for encoding in other fields, so as to acquire codewords required in other fields, as long as the variable ID is a non-negative integer, and L is a positive integer. In this manner, the variable ID may be represented as a general identifier of M, or N, etc., so as to specify that the variable is not only used to indicate a cell or a cell group ID.

The manner of converting a cell ID or cell group ID into an intermediate variable in this embodiment of the present invention has been described above, that is, adding an offset $$\frac{k(k+1)}{2}$$

to each cell ID or cell group ID to obtain a corresponding intermediate variable.

It should be noted that, persons skilled in the field can easily come up other manners of converting the variable ID into an intermediate variable, as well as the encoding method including other converting manners, in which if it intends to acquire S-SCH codewords required for frame synchronization, the encoding method including other converting manners also enables the first short code in each generated S-SCH codeword to be larger than the second short code, or the first short code in each generated S-SCH codeword to be smaller than the second short code and enables the short code distance to be all smaller than or equal to the preset threshold value.

As for a base station, after two short codes corresponding to the cell ID or cell group ID are obtained through encoding, the two short codes may be arranged in different order, so that $s_0(ID)$ an $s_1(ID)$ are formed into S-SCH codewords Sa(ID)=$[s_0(ID),s_1(ID)]$ and Sb(ID)=$[s_1(ID),s_0(ID)]$, and then the S-SCH signals respectively identified as codewords Sa(ID) and Sb(ID) are transmitted at different synchronization symbols in the same frame, so as to realize the Step 103 in the method shown in FIG. 1. All the S-SCH codewords respectively correspond to each cell ID or cell group ID one by one according to a sequence of IDs, or all the S-SCH codewords respectively correspond to each cell ID or cell group ID one by one in any random sequence.

For example, if the codewords are numbered in the sequence of IDs, a cell or cell group with an ID of m corresponds to the S-SCH codewords of $[s_0(m),s_1(m)]$ and $[s_1(m),s_0(m)]$; if the codewords are numbered in a random sequence, a cell or cell group with an ID of 1 corresponds to the S-SCH codewords of $[s_0(3),s_1(3)]$ and $[s_1(3),s_0(3)]$, and a cell or cell group with an ID of 2 corresponds to S-SCH codewords of $[s_0(4),s_1(4)]$ and $[s_1(4),s_0(4)]$.

As for the UE, the UE can acquire an SSC sequence set including all the SSC sequences obtained through the above manner, thus realizing Step 103 in the method shown in FIG. 1. Then, the UE correlates the received S-SCH signals with all the SSC sequences in the SSC sequence set, so as to identify two SSC sequences (i.e. short codes $s_0(ID)$ and $s_1(ID)$ in the S-SCH codeword) corresponding to peak correlation values.

As the S-SCH signal further carries information of a cell ID or a cell group ID, the UE may first acquire the cell ID or cell group ID and then calculate the two SSC sequences corresponding to the cell ID or call group ID, and then correlate with the received S-SCH signal, without calculating all the SSC sequences completely.

In practical applications, according to different requirements on the magnitude of the maximum short code distance $|s_0-s_1|$, Equations 3-5 may be adjusted, or the relation between the change of value of k and the change of value of variable ID may be adjusted as well. Furthermore, each variable ID may not be replaced one by one, and instead, the values of the variable IDs corresponding to the S-SCH codewords that can satisfy the above conditions can be retained, and then certain values larger than the values of the retained variable IDs are added to serve as the intermediate variables to replace the values of the variable IDs corresponding to the S-SCH code words that cannot satisfy the above conditions.

The encoding method for a frame synchronization signal according to an embodiment of the present invention has been described above in great detail. Then, the encoding apparatus for a frame synchronization signal according to the present invention has been illustrated below in great detail.

Figure 2:
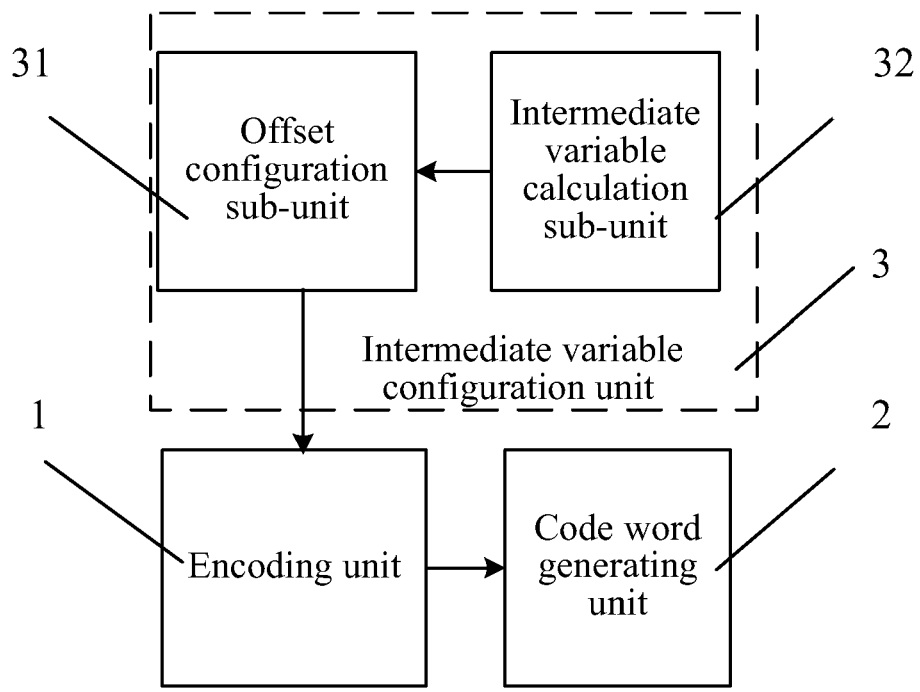
FIG. 2 is a schematic structural view of an encoding device for a frame synchronization signal according to an embodiment of the present invention.

FIG. 2 is a schematic structural view of an encoding apparatus for a frame synchronization signal according to an embodiment of the present invention. Referring to FIG. 2, the encoding apparatus for a frame synchronization signal in this embodiment includes an encoding unit 1 and a codeword generating unit 2.

The encoding unit 1 is configured to encode a predefined intermediate variable corresponding to a cell ID or cell group ID, so as to get short codes corresponding to the cell ID or cell group ID.

The codeword generating unit 2 is configured to generate S-SCH codewords according to the short codes obtained through encoding. A first short code in each generated S-SCH codeword is larger than a second short code, or a first short code in each generated S-SCH codeword is smaller than a second short code, and a short code distance thereof is all smaller than or equal to a preset threshold value.

The above encoding apparatus further includes intermediate variable configuration unit 3, configured to convert the cell ID or cell group ID into an intermediate variable according to a predefined rule. That is to say, the predefined intermediate variable required by the encoding unit 1 for encoding is obtained by converting through the intermediate variable configuration unit 3.

The intermediate variable configuration unit 3 further includes an offset configuration sub-unit 31 and an intermediate variable calculation sub-unit 32.

The offset configuration sub-unit 31 is configured to store a predefined offset, in which the predefined offset is used to ensure that, in each S-SCH codeword corresponding to the cell IDs or cell group IDs with the added predefined offset, each first short code in each generated S-SCH codeword is larger than corresponding second short code, or each first short code in each generated S-SCH codeword is smaller than corresponding second short code, and a short code distance thereof is smaller than or equal to a preset threshold value.

The intermediate variable calculation sub-unit 32 is configured to add the predefined offset to each cell ID or cell group ID sequentially, so as to obtain an intermediate variable of the cell ID or cell group ID.

Specifically, the offset stored in the offset configuration sub-unit 31 may be determined according to k calculated based on Equation 4 and Equation 5, i.e.

$$\frac{k(k+1)}{2}$$

in Equation 3. The offset stored in the offset configuration sub-unit 31 may also be determined according to the above replacement solution, that is, θ. The intermediate variable calculation sub-unit 32 is configured to calculate the intermediate variable of the cell ID or cell group ID according to Equation 3.

In this case, the encoding unit 3 is configured to perform encoding according to Equation 2.

Therefore, the above encoding apparatus takes the predefined intermediate variable as the cell ID or cell group ID corresponding to the S-SCH codeword, so as to ensure that, in all the S-SCH codewords obtained through encoding the cell ID or cell group ID, each first short code in each generated S-SCH codeword is larger than corresponding second short code, or each first short code in each generated S-SCH codeword is smaller than corresponding second short code and a short code distance thereof is all relatively small. Then, the intermediate variable serving as the cell ID or cell group ID is encoded, so as to ensure that each obtained S-SCH corresponding to the cell ID or cell group ID can satisfy the conditions that the first short code in each generated S-SCH codeword is larger than the second short code, or the first short code in each generated S-SCH codeword is smaller than the second short code, and the short code distance thereof should be relatively small, thereby enhancing the reliability of the frame synchronization.

Besides being applied to generate S-SCH codewords for frame synchronization, the above encoding apparatus is also suitable for encoding in other fields, so as to acquire codewords required in other fields, as long as the variable ID is a non-negative integer, and L is a positive integer. In this manner, the variable ID may be represented as a general identifier of M, or N, etc, so as to specify that the variable is not only used to indicate a cell or a cell group ID.

In practical applications, the apparatus shown in FIG. 2 can be configured in the UE and base station.

If the apparatus is configured in the base station, after two short codes corresponding to each call or call group ID are obtained through encoding, the two short codes are arranged in different sequences, so that $s_0(ID)$ and $s_1(ID)$ are formed into S-SCH codewords $Sa(ID)=[s_0(ID),s_1(ID)]$ and $Sb=[s_1(ID),s_0(ID)]$. Then, the functional units in the base station for sending signals are respectively used to transmit the S-SCH signals identified as codewords Sa(ID) and Sb(ID) at different synchronization symbols within the same frame. All the S-SCH codewords respectively correspond to each cell ID or cell group ID one by one in a sequence of IDs, or all the S-SCH codewords respectively correspond to each cell ID or cell group ID one by one in any random sequence.

If the apparatus is configured in the UE, the UE can also obtain a SSC sequence set including all the SSC sequences acquired through the above manner, and then other functional units in the UE for realizing relevant calculations are configured to correlate the received S-SCH signals with all the SSC sequences in the SSC sequence set, so as to identify two SSC sequences (that is, short codes $s_0(ID)$ and $s_1(ID)$ in the S-SCH codeword) corresponding to the peak correlation values.

As the S-SCH signal further carries information of a cell ID or a cell group ID, the UE can first acquire the cell ID or cell group ID and then calculate the two SSC sequences corresponding to the cell ID or call group ID through the apparatus shown in FIG. 2, and then other functional units in the UE for realizing relevant calculations are configured to correlate the calculated SSC sequences with the received S-SCH signals, without calculating all the SSC sequences completely.

It should be noted that, the persons with ordinary technical skill in the field can understand that the technical solution of the present invention is not only applicable to the secondary synchronization channel S-SCH, but also applicable to various synchronization channels.

Those with ordinary skill in the field can understand that, all or a part of the steps for realizing the method in the embodiments may be finished by the relevant hardware instructed by a computer program, and the program may be stored in a computer-readable storage medium. When the program is executed, the steps of the method in the above embodiment are performed. The storage medium includes a magnetic disk, an optical disk, a read only memory (ROM), a random access memory (RAM), and the like.

It will be apparent to those skilled in the field that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. An encoding method for a frame synchronization signal in a communication system, comprising:
   encoding a predefined intermediate variable corresponding to a cell identifier (ID) or cell group ID so as to obtain short codes corresponding to the cell ID or cell group ID;
   generating secondary synchronization channel (S-SCH) codewords according to the short codes, wherein, in each generated S-SCH codeword, a first short code is larger than a second short code, or, in each generated S-SCH codeword, a first short code is smaller than a second short code, and a short code distance thereof is all smaller than or equal to a predefined threshold value; and
   utilizing the S-SCH codewords in the communication system, the S-SCH codewords representing S-SCH signals.

2. The encoding method according to claim 1, wherein before encoding the predefined intermediate variable, the method further comprises: converting the cell ID or cell group ID into the intermediate variable according to a predefined rule.

3. The encoding method according to claim 2, wherein the process of converting the cell ID or cell group ID into the intermediate variable according to the predefined rule comprises:
   adding an offset to each cell ID or cell group ID to obtain the intermediate variable;
   wherein the offset is used to enable the first short code in each generated S-SCH codeword to be larger than the second short code, or the first short code in each generated S-SCH codeword to be smaller than the second short code, and the short code distance thereof to be smaller than or equal to the predefined threshold value.

4. The encoding method according to claim 3, wherein
   the intermediate variable obtained by adding the predefined offset to the cell ID or cell group ID is:

$$ID' = ID + \frac{k(k+1)}{2};$$

wherein ID' indicates the intermediate variable, $$k = \left\lfloor \frac{ID + \frac{k'(k'+1)}{2}}{L-1} \right\rfloor,$$

$$k' = \left\lfloor \frac{ID}{L-1} \right\rfloor,$$

ID indicates the cell ID or cell group ID; and
the intermediate variable is encoded according to following equations:

$$s_0(ID) = \mod(ID', L)$$

$$s_1(ID) = \mod\left(s_0(ID) + \left\lfloor \frac{ID'}{L} \right\rfloor + 1, L\right)$$

wherein $s_0(ID)$ indicates the first short code corresponding to the cell ID or cell group ID, $S_1(ID)$ indicates the second short code corresponding to the cell ID or cell group ID, and L is a positive integer.

5. The encoding method according to claim 4, wherein the generating the S-SCH codewords according to the short codes comprises: constructing $s_0(ID)$ and $s_1(ID)$ into S-SCH codewords $S_a(ID)$ and $S_b(ID)$, wherein $S_a(ID)=[s_0(ID),s_1(ID)]$ and $S_b(ID)=[s_1(ID),s_0(ID)]$.

6. The encoding method according to claim 5 wherein all the S-SCH codewords sequentially correspond to each cell ID or cell group ID one by one in a sequence of IDs; or
all the S-SCH codewords respectively correspond to each cell ID or cell group ID one by one in a random sequence.

7. The encoding method according to claim 6, wherein after constructing the codewords, the method further comprises:
respectively transmitting the S-SCH codewords $S_a(ID)$ and $S_b(ID)$ at different synchronization symbols within a same frame.

8. The encoding method according to claim 4, wherein the L is 31.

9. The encoding method according to claim 4, wherein there are 170 cell IDs or cell group IDs totally, and values of the IDs are from 0 to 169.

10. The encoding method according to claim 8, wherein a codeword corresponding to each cell ID or cell group ID is listed in the following table:

| ID | $s_0$ | $s_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |

-continued

| ID | $s_0$ | $s_1$ |
|---|---|---|
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| 168 | 3 | 10 |
| 169 | 4 | 11 |

11. An encoding apparatus for a frame synchronization signal in a communication system, comprising:
   an encoding unit, configured to encode a predefined intermediate variable corresponding to a cell identifier (ID) or cell group ID so as to obtain short codes corresponding to the cell ID or cell group ID; and
   a codeword generating unit, configured to generate secondary synchronization channel (S-SCH) codewords according to the short codes, wherein a first short code in each generated S-SCH codeword is larger than a second short code, or a first short code in each generated S-SCH codeword is smaller than a second short code, and a short code distance thereof is all smaller than or equal to a predefined threshold value, wherein the S-SCH codewords represent S-SCH signals and can be utilized in the communication system.

12. The encoding apparatus according to claim 11, further comprising:
   an intermediate variable configuration unit, configured to convert the cell ID or cell group ID into the intermediate variable according to a predefined rule.

13. The encoding apparatus according to claim 12, wherein the intermediate variable configuration unit further comprises:
   an offset configuration sub-unit, configured to store a predefined offset, wherein the predefined set offset is used to ensure that, in each S-SCH codeword corresponding to the cell ID or cell group ID with the predefined offset added, a first short code in each generated S-SCH codeword is larger than a second short code, or a first short code in each generated S-SCH codeword is smaller than a second short code, and a short code distance thereof is smaller than or equal to a predefined threshold value; and
   an intermediate variable calculation sub-unit, configured to add the predefined offset to each cell ID or cell group ID sequentially to obtain the intermediate variable of the cell ID or cell group ID.

14. An encoding method in a communication system, comprising:
   encoding a variable N that is a non-negative integer into two codewords $Sa(N)=[s_0(N),s_1(N)]$ and $Sb(N)=[s_1(N), s_0(N)]$, the codewords representing S-SCH signals, wherein the encoding comprises:

$$s_0(N) = \mod(N', L)$$

$$s_1(N) = \mod\left(s_0(N) + \left\lfloor \frac{N'}{L} \right\rfloor + 1, L\right)$$

wherein, $$N' = N + \frac{k(k+1)}{2}$$

$$k = \left\lfloor \frac{N + \frac{k'(k'+1)}{2}}{L-1} \right\rfloor$$

$$k' = \left\lfloor \frac{N}{L-1} \right\rfloor$$

$$s_0(N), s_1(N) \in \{0, 1, \ldots, L-1\},$$

L is a positive integer; and
   utilizing the S-SCH codewords in the communication system.

15. The encoding method according to claim 14, wherein the L is 31.

16. The encoding method according to claim 14, wherein the variable N is a cell ID or cell group ID.

17. The encoding method according to claim 16, wherein all codewords sequentially correspond to each cell ID or cell group ID one by one in a sequence of N, or all S-SCH codewords correspond to each cell ID or cell group ID respectively in random sequence.

18. The encoding method according to claim 17, wherein Sa(ID) and Sb(ID) are used to realize frame synchronization, and the method further comprises respectively transmitting Sa(ID) and Sb(ID) at different synchronization symbols in the same frame.

* * * * *